(12) United States Patent
Pinault et al.

(10) Patent No.: US 11,170,948 B2
(45) Date of Patent: Nov. 9, 2021

(54) METHOD FOR PREPARING AN ELECTRODE COMPRISING A SUBSTRATE, ALIGNED CARBON NANOTUBES AND A METAL OXIDE DEPOSITED BY REDUCTIVE DEPOSITION

(71) Applicant: COMMISSARIAT A L'ENERGIE ATOMIQUE ET AUX ENERGIES ALTERNATIVES, Paris (FR)

(72) Inventors: Mathieu Pinault, Fresnes (FR); Fouad Ghamouss, Joues-les-Tours (FR); Francois Tran Van, Fondettes (FR); Emeline Charon, Paris (FR); Baptiste Pibaleau, Savigny sur Orge (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 16/628,931

(22) PCT Filed: Jul. 6, 2018

(86) PCT No.: PCT/FR2018/051706
§ 371 (c)(1),
(2) Date: Jan. 6, 2020

(87) PCT Pub. No.: WO2019/008297
PCT Pub. Date: Jan. 10, 2019

(65) Prior Publication Data
US 2020/0227212 A1    Jul. 16, 2020

(30) Foreign Application Priority Data
Jul. 7, 2017    (FR) ..................................... 17 56472

(51) Int. Cl.
*H01G 11/86*    (2013.01)
*H01G 11/36*    (2013.01)
(Continued)

(52) U.S. Cl.
CPC ............. *H01G 11/86* (2013.01); *H01G 11/36* (2013.01); *H01G 11/46* (2013.01);
(Continued)

(58) Field of Classification Search
USPC .......................................... 427/58, 122, 126.3
See application file for complete search history.

(56) References Cited

U.S. PATENT DOCUMENTS 9,911,544 B1 * 3/2018 Meyyappan ........... H01G 11/86
9,979,017 B2 * 5/2018 Rojeski ................. H01M 4/131
(Continued)

FOREIGN PATENT DOCUMENTS

| CN | 103346021 A | 10/2013 |
| WO | WO 2009/103925 A2 | 8/2009 |
| WO | WO 2015/071408 A1 | 5/2015 |

OTHER PUBLICATIONS

U.S. Appl. No. 16/488,798, filed Feb. 28, 2018, Mathieu Pinault et al.
(Continued)

*Primary Examiner* — Brian K Talbot
(74) *Attorney, Agent, or Firm* — Oblon, McClelland, Maier & Neustadt, L.L.P.

(57) ABSTRACT

The present invention relates to a method for preparing an electrode comprising a metal substrate, vertically aligned carbon nanotubes and a metal oxide deposited over the entire length of said vertically aligned carbon nanotubes, said method comprising the following consecutive steps: (a) synthesizing, on a metal substrate, a mat of vertically aligned carbon nanotubes; and (b) depositing a metal oxide
(Continued)

matrix over the entire height of said vertically aligned carbon nanotube mat via spontaneous reduction at a temperature not exceeding 40° C. The present invention also relates to said electrode and to the uses thereof.

8 Claims, 4 Drawing Sheets

(51) Int. Cl.
    *H01G 11/46*     (2013.01)
    *H01M 4/04*     (2006.01)
    *H01M 4/1393*     (2010.01)
    *H01G 11/26*     (2013.01)

(52) U.S. Cl.
    CPC ....... *H01M 4/0402* (2013.01); *H01M 4/1393* (2013.01); *H01G 11/26* (2013.01)

(56) References Cited

U.S. PATENT DOCUMENTS

| | | | |
|---|---|---|---|
| 2011/0163296 A1* | 7/2011 | Pace | B82Y 15/00 257/24 |
| 2012/0094192 A1* | 4/2012 | Qu | H01M 4/134 429/336 |
| 2012/0301781 A1* | 11/2012 | Kang | H01M 4/0404 429/211 |
| 2013/0065050 A1* | 3/2013 | Chen | C23C 16/26 428/367 |
| 2013/0189586 A1 | 3/2013 | Sarrazin et al. | |
| 2013/0216811 A1* | 8/2013 | Ghasemi-Nehjad | H01M 8/0241 428/220 |
| 2017/0190579 A1* | 7/2017 | Cola | C01B 32/168 |
| 2018/0358618 A1* | 12/2018 | Tour | H01M 10/0525 |
| 2020/0286690 A1* | 9/2020 | Pinault | C25D 13/12 |

OTHER PUBLICATIONS

International Search Report dated Oct. 17, 2018 in PCT/FR2018/051706 filed Jul. 6, 2018, citing documents AQ-AR therein, 2 pages.
Preliminary French Search Report dated Feb. 22, 2018 in French Patent Application No. 1756472 (with English Translation of Categories of Cited Documents), citing document AQ therein, 2 pages.
Zhang et al., "Fabrication of a vertically aligned carbon nanotube electrode and its modification by nanostructured $MnO_2$ for supercapacitors," Pure and Applied Chemistry, vol. 81, No. 12, Nov. 16, 2009, pp. 2317-2325, XP055453654.
Ma et al., "Synthesis and characterization of manganese dioxide spontaneously coated on carbon nanotubes," Carbon, vol. 45, No. 2, 2007, pp. 375-382, XP005800067.
Li et al., "Vertically aligned carbon nanotube@$MnO_2$ nanosheet arrays grown on carbon cloth for high performance flexible electrodes of supercapacitors," RSC Advances, vol. 5, Sep. 7, 2015, p. 77437-77442.
Lou et al., "Facile synthesis of manganese oxide/aligned carbon nanotubes over aluminium foil as 3D binder free cathodes for lithium ion batteries," Journal of Materials Chemistry A, vol. 1, Jan. 16, 2013, pp. 3757-3767.
Pinault et al., "Growth of multiwalled carbon nanotubes during the initial stages of aerosol-assisted CCVD," Carbon, vol. 43, 2005, pp. 2968-2976.
Pinault et al., "Evidence of Sequential Lift in Growth of Aligned Multiwalled Carbon Nanotube Multilayers," Nano Letters, vol. 5, No. 12, Nov. 8, 2005, pp. 2394-2398.
Doerfler et al., "High power supercap electrodes based on vertical aligned carbon nanotubes on aluminum," Journal of Power Sources, vol. 227, 2013, pp. 218-228.
Liatard et al., "Vertically-aligned carbon nanotubes on aluminum as a light-weight positive electrode for lithium-polysulfide batteries," Chemical Communications, vol. 51, Apr. 2, 2015, pp. 7749-7752.
Arcila-Velez et al., "Roll-to-roll synthesis of vertically aligned carbon nanotube electrodes for electrical double layer capacitors," Nano Energy, vol. 8, 2014, pp. 9-16.

\* cited by examiner

METHOD FOR PREPARING AN ELECTRODE COMPRISING A SUBSTRATE, ALIGNED CARBON NANOTUBES AND A METAL OXIDE DEPOSITED BY REDUCTIVE DEPOSITION

TECHNICAL FIELD

The present invention belongs to the field of devices for storing and restoring electrical energy and more particularly to the field of electrodes notably useful for supercapacitors.

Indeed, the present invention relates to a method for preparing an electrode having (i) a metal substrate, (ii) carbon nanotubes vertically aligned on said substrate and (iii) a metal oxide deposited along said carbon nanotubes by reductive deposition.

The present invention also relates to said electrode thereby prepared and the different uses thereof and notably in a supercapacitor.

Prior Art

To enable the development of renewable energies and the reduction of gas emissions, the storage of electricity is one of the greatest challenges to meet. Among the numerous autonomous sources, supercapacitors, based on rapid ion charge/discharge cycles on carbon containing surfaces, lie between capacitors and batteries. Their storage efficiency (>95%), their safety, their reliability and their lifetime make them good candidates for complementing or replacing existing solutions such as, for example, electrochemical batteries, flywheels or magnetic storage.

Supercapacitors, the market of which is rapidly expanding, have two electrodes, i.e. an anode and a cathode, which are electrically isolated by a separator, an electrolyte being arranged between each electrode and the separator.

One of the important parameters for a supercapacitor is the capacitance of the system. The latter mainly depends on the correlation between the materials chosen for the electrodes, the design of these electrodes and the electrolyte.

In commercially available supercapacitors, the surface of the electrodes is composed of activated carbon. The latter is a porous material, electron conducting, electrochemically stable and supplying a high surface area per unit of volume, i.e. greater than 500 $m^2.g^{-1}$. However, the porosity of activated carbon is difficult to control: it depends, on the one hand, on the porosity of the raw material used such as carbon rich organic plant matter and, on the other hand, the physical or chemical activation method implemented. The existence of a complex and poorly controlled porosity in the activated carbon and also the existence of undesirable functional groups on its surface affect the capacitance and the performances of supercapacitors made of activated carbon.

In this context, the use of nanomaterials well organised at the nanometric scale such as vertically aligned carbon nanotubes (VACNTs) is very promising. Several electrode materials based on VACNTs have demonstrated interesting specific capacitances, thereby validating the interest of such a configuration (alignment and regular spacing of the nanotubes in the material) in terms of gain in energy and especially power of the supercapacitor. It should be noted that, within the context of supercapacitors, the metal substrate on which the VACNTs are prepared is used as current collector.

To increase the stored energy of VACNTs, one of the solutions consists in combining them with electroactive materials deposited on the VACNTs such as electron conducting polymers (ECP) or metal oxides. This is then known as pseudocapacitance. In this case, the energy is stored by two simultaneous processes: electrostatic process and redox process.

With regard to electrode materials based on VACNTs and metal oxide, manganese oxide ($MnO_2$) is one of the most promising materials on account of its low cost, its natural abundance, its environmentally friendly aspect and its pseudocapacitive performances. The electrochemical performances of $MnO_2$ depend to a large extent on its morphological properties and its specific surface. In general, the chemical structure, the morphology, the specific surface, the porosity, the electrical conductivity and ionic transport in the pores play a crucial role in the determination of the electrochemical performances of $MnO_2$.

Among methods that can be used to deposit $MnO_2$ may be cited electrochemical deposition, hydrothermal deposition, sol-gel synthesis but also reductive deposition or spontaneous chemical deposition. In this latter technique, the surface of the VACNTs plays the role of electron donor and thus the role of reducer, which induces a preferential precipitation of $MnO_2$ on the VACNTs. In this technique, the spontaneous chemical deposition of $MnO_2$ on the VACNTs is generally carried out at a temperature greater than or equal to 70° C.

Indeed, the patent application CN 103346021 [1] describes the elaboration of electrochemical capacitors in which the positive electrode is constituted of a composite based on a carpet of aligned carbon nanotubes which may be directly formed on a conductive substrate and manganese oxide or polyaniline and the negative electrode is constituted of a carpet of aligned carbon nanotubes which may be directly formed on a conductive substrate and polypyrrole, the electrolytes being non-aqueous electrolytes. In one of the examples presented, the VACNTs are formed on a nickel foam at 800° C. with ferrocene/ethanol in the presence of argon/hydrogen. Then, these VACNTs are brought into contact with a solution of potassium permanganate ($KMnO_4$) heated to 70° C. and, after 2 h of reaction, $MnO_2$ is deposited on the VACNTs in a quantity of 66% by weight compared to the total weight of the composite.

Li et al, 2015 [2] have grown $MnO_2$ in a homogeneous manner on the whole of the surface of very short VACNTs (2-5 μm) and of large diameters (>100 nm) formed on carbon fibre cloth by PECVD (Plasma-Enhanced Chemical Vapour Deposition) using a solution of $KMnO_4$ in aqueous medium in an autoclave at 180° C. for 30 min. The composite thereby obtained shows a specific capacitance of 235 $F.g^{-1}$ at 2 $mV.s^{-1}$ compared to the total weight of the composite and a capacitance of 188 $F.g^{-1}$ at 100 $mV.s^{-1}$. The composite is moreover stable to cycling at 5 $A.g^{-1}$ up to 500 charge and discharge cycles.

Lou et al, 2013 [3] report the elaboration of lithium battery electrodes based on VACNTs formed on a film of aluminium then covered with $MnO_2$ by reductive deposition from $KMnO_4$. The growth of the VACNTs is carried out on pellets of aluminium (99.45%) by CVD (Chemical Vapour Deposition) at 640° C. in the presence of ferrocene and ethanol (0.05 M) under argon/hydrogen for 30 min (60 μm, 2 am/min, average diameter 13 nm). The deposition of $MnO_2$ is carried out by spontaneous reduction of $KMnO_4$ according to a protocol derived from the works of Ma et al, 2007 [4]. More particularly, the VACNTs are immersed in a 0.1 M aqueous solution of $KMnO_4$ at ambient temperature for 1 h then at 70° C. for 3 h. The authors demonstrate a homogeneous coverage of the VACNTs by $MnO_2$ and measured capacitances of 308 $mA.h.g^{-1}$ at 0.1 C comparable to the theoretical capacitance of 95 $mA.h.g^{-1}$ at 20 C and a maintaining of the capacitance at 133 mA.h.g$^{-1}$ after 100 cycles at 1 C. They link the drop in performances (increase of the SEI for "Solid Electrolyte Interphase") to a progressive degradation of the deposition by the presence of residual water, an effect which they manage to limit through treatments of the Al/VACNT/MnO$_2$ electrodes under argon between 200 and 300° C. to the detriment of the initial capacitance.

However, the inventors reproducing the method such as described by Lou et al, 2013 [3] have realised that a crust of MnO$_2$ formed on the surface of the carpet of VACNTs (see experimental section hereafter point 11.1.1). Such a crust acts as a blocking layer limiting access to the whole of the volume of the VACNTs and thereby affecting the storage capacity and power performances of the electrode following the increase in resistivity of the assembly consisting of the VACNTs covered with a layer of MnO$_2$.

In addition, Zhang et al, 2009 [5] propose an electrode for supercapacitor based on VACNTs formed on a tantalum film then covered with a thick porous layer of MnO$_2$ by reductive deposition from KMnO$_4$. The method implemented to synthesise the VACNTs on the tantalum sheet consists in a CVD method with, as catalyst, cobalt and, as carbon source, ethylenediamine. In these conditions, the authors obtain a carpet of nitrogenated carbon nanotubes known as "bamboos". The average diameter of these nanotubes is greater than 100 nm as may be seen in FIGS. 1A and 1B. The carpet of VACNTs thereby obtained with nanotubes having such an average diameter cannot be a dense carpet, i.e. a carpet in which the density of the vertically aligned carbon nanotubes extending perpendicularly to the metal substrate is greater than or equal to 10$^8$ nanotubes.cm$^{-2}$. For the deposition of MnO$_2$ on these nanotubes, the latter is obtained by placing the tantalum film with the VACNTs, for 30 min, at ambient temperature, in an aqueous solution comprising 0.01 M of KMnO$_4$ and 10 M of HNO$_3$.

However, the inventors reproducing the method such as described by Zhang et al, 2009 [5] realised that such a method would not make it possible to obtain a deposition of MnO$_2$ along the VACNTs for dense carpets, whereas, in the same conditions but in the absence of nitric acid, a deposition is obtained (see experimental section hereafter point 11.1.2).

Due to the increasing interest in supercapacitors, the inventors have set themselves the aim of proposing an industrialisable method making it possible to obtain an electrode notably intended to be used in a supercapacitor which has (i) a metal substrate, (ii) VACNTs on said substrate and (iii) a metal oxide deposited along said VACNTs in a homogeneous manner.

DESCRIPTION OF THE INVENTION

The present invention makes it possible to resolve the technical problems as defined previously and to attain the aim that the Inventors have set themselves.

Indeed, the works of the inventors have made it possible to develop an industrialisable method making it possible to obtain an electrode with a metal substrate on which carbon nanotubes are vertically aligned and coated with a metal oxide such as manganese oxide, said electrode having interesting performances in terms of capacitance notably for an application in a supercapacitor. As a reminder, capacitance is the property of the electrical conductor to contain a certain electrical charge level for a determined electric potential.

More particularly, the present invention relates to a method for preparing an electrode comprising a metal substrate, vertically aligned carbon nanotubes and a metal oxide deposited over the whole length of said vertically aligned carbon nanotubes, said method comprising the following successive steps:

a) synthesizing, on a metal substrate, a carpet of vertically aligned carbon nanotubes of which the density is comprised between 10$^8$ and 10$^{13}$ nanotubes.cm$^{-2}$ of substrate;

b) bringing into contact said carpet of vertically aligned carbon nanotubes synthesized on the metal substrate during step (a) with an aqueous solution comprising a precursor of said metal oxide of which the redox potential is greater than the relative potential of the carpet of vertically aligned carbon nanotubes synthesised on the metal substrate, said aqueous solution comprising the precursor of the metal oxide consisting in said precursor diluted or solubilised in water, no other chemical compound different from said precursor being present in the solution implemented during said step (b), the bringing into contact being exclusively carried out at a temperature less than or equal to 40° C., whereby a metal oxide matrix is deposited over the whole length of said vertically aligned carbon nanotubes.

The inventors have associated, with the synthesis of a carpet of VACNTs on a metal substrate, a chemical deposition of metal oxide in particular conditions making it possible to obtain a deposition in the thickness of the carpet of VACNTs and this without formation of crust of metal oxide on the surface of the carpet of VACNTs. The particular conditions implemented are linked to a spontaneous reduction of the precursor of the metal oxide in the presence of the VACNTs and this at a temperature less than or equal to 40° C. In addition, this chemical deposition technique is not limited to manganese oxide and may be generalised to other metal oxides.

The present invention applies to any type of vertically aligned carbon nanotubes, whatever their method of preparation. Thus, the carbon nanotubes implemented within the scope of the present invention may be nanotubes with a single layer of graphene (SWNTs), nanotubes with two layers of graphene (DWNTs), nanotubes with several layers of graphene (MWNTs) or one of the mixtures thereof.

Step (a) of the method according to the invention consists in synthesizing, on a metal substrate, carbon nanotubes vertically aligned and extending perpendicularly on the surface of the substrate thereby forming a carpet of nanotubes the base of which corresponds to the substrate.

Within the scope of the present invention, the metal substrate on which the VACNTs are prepared is advantageously a substrate made of a material based on titanium, nickel, aluminium, copper, chromium, tantalum, platinum, gold, silver, stainless steel, silicon or carbon.

"Material based on a given metal" is taken to mean not just a material made of said non-alloyed metal but also a material made of an alloy comprising said metal and at least one other element and notably at least one other metal element.

It should be noted that, to minimise the weight of the electrodes and, consequently, the weight of the supercapacitors, light metal substrates such as aluminium based substrates are to be favoured. "Aluminium based material" is taken to mean not just a material made of non-alloyed aluminium but also a material made of aluminium alloy such as an aluminium and magnesium alloy, an aluminium and manganese alloy, an aluminium and copper alloy, an aluminium and silicon alloy, an aluminium, magnesium and silicon alloy or even an aluminium and zinc alloy.

The substrate implemented in the invention has any shape, i.e. a shape suited to the subsequent use of the electrode. As illustrative examples, this substrate may have a flat shape, a thread shape (woven thread, non-woven thread, fibre, grid), a strip shape, a hollow cylindrical shape or even an alveolar shape (foam). Typically the substrate implemented in the invention has a thickness comprised between 1 µm and 500 µm, notably between 2 µm and 200 µm, in particular, between 5 µm and 100 µm and, more particularly, between 10 µm and 75 µm.

Those skilled in the art know different methods making it possible to prepare vertically aligned nanotubes such as defined previously, said methods being able to be used in step (a) of the method according to the invention.

As more particular examples of methods making it possible to prepare vertically aligned carbon nanotubes, it is possible to cite physical methods based on the sublimation of carbon such as electric arc, laser ablation methods or methods using a solar furnace and chemical methods such as the CVD method or consisting in pyrolizing carbon sources on metal catalysts. A method particularly suited to the preparation of CNTs is the CVD-injection method notably described in the article of Pinault et al, 2005 [6] and the article of Pinault et al, 2005 [7].

In a particular embodiment, the synthesis method implemented, i.e. using chemical vapour deposition (CVD) at a temperature less than or equal to 650° C., is notably the method described in [8-11]. Since these techniques may be carried out by batch-to-batch technique/roll-to-roll technique, they are easily industrialisable.

Briefly, this synthesis takes place in the presence of a catalytic source and a carbon source. The catalytic source may be pre-deposited on the substrate or, conversely, be co-injected with the carbon source. The catalytic source is notably selected from transition metal metallocenes such as, for example, ferrocene, nickelocene, cobaltocene or any of the mixtures thereof. The carbon source, which may be liquid, solid or gaseous, is notably selected from hydrocarbons, alcohols, carbon monoxide, carbon halides, toluene, cyclohexane, plant based oils, benzylamine, acetonitrile, ethylene, acetylene, xylene, methane and any of the mixtures thereof. In a particular embodiment of this synthesis, ferrocene is conveyed into the reactor by means of a toluene solution in the form of an aerosol.

In this particular embodiment of step (a) of the method according to the invention, this synthesis is advantageously carried out at a temperature comprised between 500° C. and 620° C. Similarly, this synthesis is typically carried out at a pressure comprised between $10^3$ Pa and $10^5$ Pa and, in particular, between $0.9.10^5$ Pa and $10^5$ Pa.

As a function of the particular protocol used for the synthesis of the carbon nanotubes during step (a) of the method, the density of the vertically aligned carbon nanotubes extending perpendicularly to the metal substrate may be variable. It is possible to obtain a density comprised between $10^6$ and $10^{13}$ nanotubes.cm$^{-2}$ of substrate. Within the scope of the present invention, a material having a dense carpet of vertically aligned carbon nanotubes is implemented, with of the order of $10^8$ to $10^{13}$ nanotubes.cm$^{-2}$, notably with of the order of $10^8$ to $10^{12}$ nanotubes.cm$^{-2}$ and, in particular, of the order of $10^{11}$ to $10^{12}$ nanotubes.cm$^{-2}$.

Following the synthesis of the vertically aligned carbon nanotubes and prior to step (b), the vertically aligned carbon nanotubes may be subjected to an oxidizing treatment (or pre-treatment), i.e. aiming to oxidize the surface of the nanotubes implemented and/or to prepare the surface for a future oxidation by formation of radicals. An oxidation modifies the surface of the nanotubes notably by fixing and/or by introducing, on the ends or on defects of the nanotubes, oxygen rich groups such as carboxylic (—COOH), hydroxyl (—OH), alkoxyl (—OX with X representing an alkyl group, an acyl group or an aroyl group), carbonyl (—C═O), percarbonic (—C—O—OH) and sometimes amide (—CONH) type groups.

Such an oxidizing treatment relies on two major types of surface modification based on:
physical treatments such as treatment by plasma notably oxygen plasma, UV treatment, X or y ray treatment, treatment by irradiation with electrons and with heavy ions or
chemical treatments such as treatment with alcoholic potash, treatment by a strong acid (HCl, $H_2SO_4$, $HNO_3$, $HClO_4$), treatment with soda, treatment by a strong oxidizer ($KMnO_4$, $K_2Cr_2O_7$, $KClO_3$ or $CrO_3$ in hydrochloric acid, sulphuric acid or in nitric acid), treatment with ozone and thermal treatment under oxygenated atmosphere ($O_2$, $H_2O$, etc.).

Such nanotubes, once this oxidizing treatment has been implemented, may be in the form of surface modified nanotubes such as, for example, negatively charged nanotubes.

Step (b) of the method according to the present invention consists in applying, chemically, on the carpet of carbon nanotubes synthesized during step (a) on the metal substrate, a metal oxide matrix.

"Metal oxide matrix" is taken to mean, within the scope of the present invention, a structure being in the form of a film (or sheath), porous or non-porous, on the surface of the carbon nanotubes implemented in the method of the invention and essentially constituted of a metal oxide. In the carpet of carbon nanotubes such as obtained following step (a) of the method, the matrix is associated with the carbon nanotubes while being deposited over the whole length of the VACNTs, that is to say on and at the level of the lateral surface of the carbon nanotubes, being able to advantageously form a sheath around the nanotubes, as well as in the space between the nanotubes. Typically, advantageously, the thickness of this sheath is homogeneous for a carbon nanotube and, in a more advantageous manner, it is homogeneous for all of the carbon nanotubes of the carpet.

"Metal oxide" is taken to mean, within the scope of the present invention, any metal oxide typically used to coat carbon nanotubes and notably vertically aligned carbon nanotubes. Typically, the metal oxide implemented within the scope of the present invention is an oxide of at least one metal such as notably at least one transition metal. Advantageously, the metal oxide implemented within the scope of the present invention is selected from the group consisting of a ruthenium oxide ($RuO_2$ or $RuO_4$), a titanium oxide ($TiO_2$), a manganese oxide (MnO, $Mn_3O_4$, $Mn_2O_3$ or $MnO_2$), a copper oxide ($Cu_2O$), a nickel oxide ($NiO_2$ or $Ni_2O_3$), a cobalt oxide ($Co_2O_3$ or $Co_3O_4$), an iron oxide ($Fe_2O_3$ or $Fe_3O_4$), a chromium oxide ($CrO_2$, $CrO_3$ or $Cr_2O_3$), a vanadium oxide ($VO_2$, $V_2O_3$ or $V_2O_5$), and one of the mixtures thereof. "Mixture" is taken to mean, for example, an oxide selected from the group consisting of CuNiO, $NiCo_2O_4$, CoO—$RuO_2$, CuO—$RuO_2$, $Fe_2O_3$—$RuO_2$, NiO—$RuO_2$ and CuNiO—$RuO_2$.

As a function of the metal oxide to deposit on the VACNTs by chemical deposition via spontaneous reduction, those skilled in the art will know how to determine, without inventive effort, the precursor of said metal oxide to implement. As indicated previously, the precursor implemented must have a redox potential greater than the relative potential of the carpet of vertically aligned carbon nanotubes synthesized on the metal substrate and this in the conditions of bringing into contact during step (b). Thus, the precursor is capable of being reduced by the vertically aligned carbon nanotubes synthesised on the metal substrate.

As illustrative non-limiting examples of such precursors, it is possible to cite a perruthenate salt such as sodium perruthenate or potassium perruthenate; a pertitanate salt such as sodium pertitanate or potassium pertitanate; a permanganate salt such as sodium permanganate or potassium permanganate; a perferrate salt such as sodium perferrate or potassium perferrate; a perchromate salt such as sodium perchromate or potassium perchromate; a pervanadate salt such as sodium pervanadate or potassium pervanadate; or one of the mixtures thereof.

Advantageously, the precursor of the metal oxide is present in the aqueous solution in a quantity comprised between 1 mM to 500 mM, notably between 2 mM and 100 mM, in particular, between 4 mM and 50 mM and, more particularly, of the order of 10 mM (i.e. 10 mM±: 5 mM). Typically, the aqueous solution comprising the precursor of the metal oxide does not contain any other reducer than the VACNTs such as an acid or another reducer such as $MnSO_4$. The aqueous solution comprising the precursor of the metal oxide consists in said precursor diluted or solubilised in water, no other chemical compound different from said precursor being present in the solution implemented during step (b) of the method according to the invention, which excludes the method described by Zhang et al, 2009 [5].

Within the scope of step (b) of the method according to the invention, the chemical deposition of the metal oxide matrix is carried out in a spontaneous manner. In other words, no particular activation such as heat, the application of mechanical energy or the application of electrical energy has to be implemented in order to obtain said deposition. Typically, during step (b) of the method according to the invention, the bringing into contact between the VACNTs and the aqueous solution comprising the precursor of the metal oxide is exclusively carried out at a temperature less than or equal to 40° C. Thus, as long as the VACNTs are in the presence of the aqueous solution comprising the precursor of the metal oxide, the temperature is less than or equal to 40° C., which excludes the method described by Lou et al, 2013 [3]. Advantageously, the temperature less than or equal to 40° C. implemented during step (b) is ambient temperature (i.e. 22° C.±5° C.).

Following step (b), the method according to the invention may have a rinsing step and possibly a drying step.

The rinsing step has, for main aim, to clean, to remove residues/impurities of the metal oxide precursor type which could remain on parts of the substrate, the carbon nanotubes or the metal oxide matrix and which could not have been deposited. Such residues/impurities could lead to problems during the encapsulation step and malfunctions of the supercapacitor. Advantageously, the rinsing step is carried out by soaking the metal substrate provided with the carbon nanotubes and the metal oxide matrix in water and/or ethanol. The rinsing consists in soaking the metal substrate provided with the carbon nanotubes and the metal oxide matrix in water and/or in ethanol for a variable time of 1 to 30 min and renewing the operation with the same solvent or a different solvent, if necessary up to five times for example.

In addition, the optional step of drying the metal substrate provided with the carbon nanotubes and the metal oxide matrix may be carried out by leaving the latter, once rinsed with water and/or with ethanol, in the open air in order that the water and/or the ethanol used for the rinsing evaporate.

In an alternative, the metal substrate provided with the carbon nanotubes and the metal oxide matrix, once rinsed, may be dried by heating it in an oven under vacuum between 50° C. and 200° C. and notably at a temperature of the order of 80° C. (80° C.±10° C.), or by means of an infrared lamp, for a duration comprised between 12 h and 36 h and notably of the order of 24 h (24 h±6 h). This alternative may be implemented in the case of a continuous method.

The present invention also relates to an electrode capable of being prepared by the method according to the invention such as defined previously. This electrode has a metal substrate provided with carbon nanotubes and a metal oxide matrix. It is thus a monolayer electrode.

Everything that has been indicated previously regarding the metal substrate also applies to the electrode according to the present invention.

Advantageously, the density of the vertically aligned carbon nanotubes, in the electrode according to the present invention, may be variable. The latter is comprised between $10^8$ and $10^{13}$ nanotubes.cm$^{-2}$ of electrode. It is thereby possible to have a material having a dense carpet of vertically aligned carbon nanotubes, with of the order of $10^8$ to $10^{12}$ nanotubes.cm$^{-2}$ and notably of the order of $10^{11}$ to $10^{12}$ nanotubes.cm$^{-2}$.

The percentage by weight of the metal oxide matrix expressed compared to the total weight of the composite comprising the carbon nanotubes and this matrix is comprised between 20% and 80%. As particular illustrative examples, this weight percentage in oxide compared to the total weight of the composite comprising the carbon nanotubes and this matrix may be of the order of 60% (i.e. 60%±5%) or of the order of 70% (i.e. 70%±5%).

In the electrode according to the invention, the carbon nanotubes advantageously have a length greater than 10 μm. In certain embodiments, this length may be greater than 20 μm, or even greater than 30 μm or 50 μm.

Finally, the electrode according to the invention advantageously has a capacitance of least 185 mF/cm$^2$ or at least 185 F.g$^{-1}$ per total weight of composite.

The present invention also relates to the use of such an electrode or capable of being prepared by the method of the invention as positive/negative electrode of a device for storing and restoring electricity such as a supercapacitor or a battery, as electrode for photovoltaic device, in materials for the storage of $CO_2$ or as electrode for electrochemical sensors. Thus, the present invention relates to a device comprising an electrode according to the present invention or capable of being prepared by the method of the invention, said device being selected from the group consisting of a device for storing and restoring electricity such as a supercapacitor or a battery; a photovoltaic device; a material for the storage of $CO_2$ and an electrochemical sensor.

In a particular embodiment, a device for storing and restoring electricity according to the invention includes at least two monolayer electrodes (positive and negative) or instead at least three electrodes of which two monolayer electrodes (positive) and a double layer electrode (negative). As a reminder, a monolayer electrode only comprises a single active surface, whereas a double layer electrode comprises two active surfaces respectively on its two opposite faces.

Other characteristics and advantages of the present invention will become clearer to those skilled in the art on reading the following examples given for illustrative purposes and in no way limiting, with reference to the appended figures.

DETAILED DESCRIPTION OF PARTICULAR EMBODIMENTS

I. Preparation of VACNTs

Figure 1:
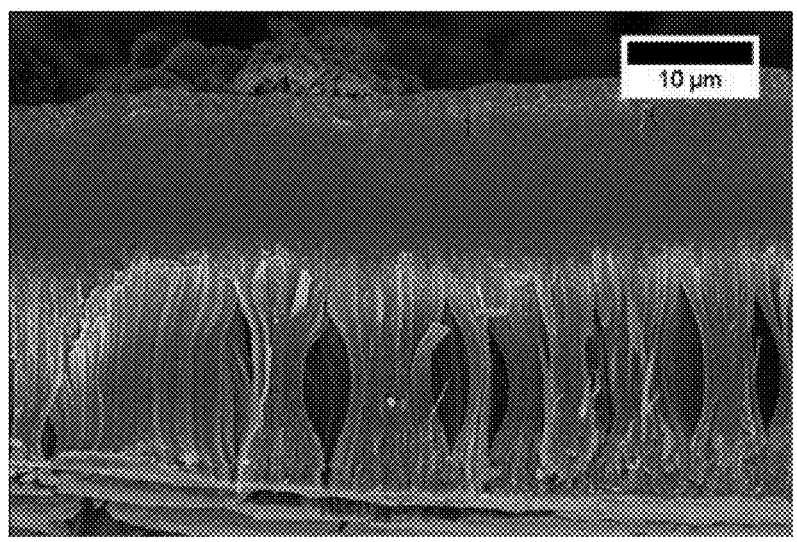
FIG. 1 shows a SEM micrograph after deposition by spontaneous reduction of $KMnO_4$ on VACNTs in the conditions of Lou et al, 2013 [3].

I.1. Method of Growth on Stainless Steel

The CVD injection method enables the efficient and reproducible growth of VACNTs on substrates made of 316L stainless steel in the form of pellets having a thickness comprised between 50 and 500 µm and a diameter comprised between 8 and 16 mm.

To do so, the method requires the initial deposition of a sub-layer of ceramic (based on SiOx) obtained from toluene and tetraethyl orthosilicate (TEOS), on the surface of the substrate before the nanotube growth step. Different injection durations were thus tested with the aim of depositing a ceramic sub-layer which is both sufficiently thick to fulfil its role of diffusion barrier for the metal particles and sufficiently thin so as not to increase the electrical resistance of the electrodes. The nature of the reaction atmosphere makes it possible to play on the diameter and the density of carbon nanotubes of the carpet formed on the metal substrate. The international patent WO 2009/103925 notably describes such a method [12].

Low density VACNTs on stainless steel are obtained at 800 or 850° C. from a toluene/ferrocene solution (2.5% by weight) injected under argon uniquely. The toluene/ferrocene synthesis duration depends on the desired thickness of carpet, typically 3 to 5 min for 100 µm.

High density VACNTs on stainless steel are obtained from the same toluene/ferrocene solution but with a reaction atmosphere based on argon/hydrogen and acetylene and for a temperature varying between 600 and 800° C.

Thus, the deposition of metal oxide ($MnO_2$) was carried out on the carpet of VACNTs on stainless steel (15 to 200 µm length and 10-40 nm average outer diameter) controlled by scanning electron microscopy (SEM) and transmission electronic microscopy (TEM). The measured surface densities lie in the range 1 to $5 \times 10^9$ VACNT/$cm^2$ for VACNTs of average diameter of 40 nm (low density) and in the range 1 to $5 \times 10^{11}$ VANTC/$cm^{-2}$ for VACNTs of average diameter of 10 nm (high density).

I.2. Method of Growth on Aluminium

Concerning the direct CVD growth of VACNTs on aluminium, the lowering of the growth temperature of the carpet of aligned CNTs (580 to 615° C. depending on the reaction atmospheres) is possible thanks notably to the use of a gaseous carbon source ($C_2H_2$) in the presence of hydrogen and ferrocene as metal precursor.

For high densities on aluminium, one works around 600° C. with a 10% toluene/ferrocene solution and a mixture of argon/hydrogen and acetylene. The duration of the toluene/ferrocene synthesis also depends on the desired thickness of carpet, typically 20 or 50 min to reach 100 µm.

The international application WO 2015/071408 notably describes such methods [8].

Despite CNT growth speeds lower than at high temperatures (<10 µm·$min^{-1}$ at 580° C.), it is possible to produce VACNT/Al electrodes without pre-treatment of the aluminium (crude or alloy) surface. The characteristics (controllable length of 10 to 100 µm, average outer diameter: 6-12 nm) are at the level of the prior art. The measured surface densities are much greater than those obtained on stainless steel without acetylene: in the range 1 to $5 \times 10^{11}$ CNT/$cm^2$.

II. Deposition of Manganese Oxide on VACNTs by Reductive Deposition

II.1. Methods of the Prior Art

II.1.1 Lou et al, 2013 [3]

Reproducing the conditions described in the works of Lou et al, 2013 [3] such as described in the "Prior art" section above, a crust of manganese oxide forms on the surface of the carpet of VACNTs (FIG. 1).

II.1.2 Zhang et al, 2009 [5]

Figure 2A:
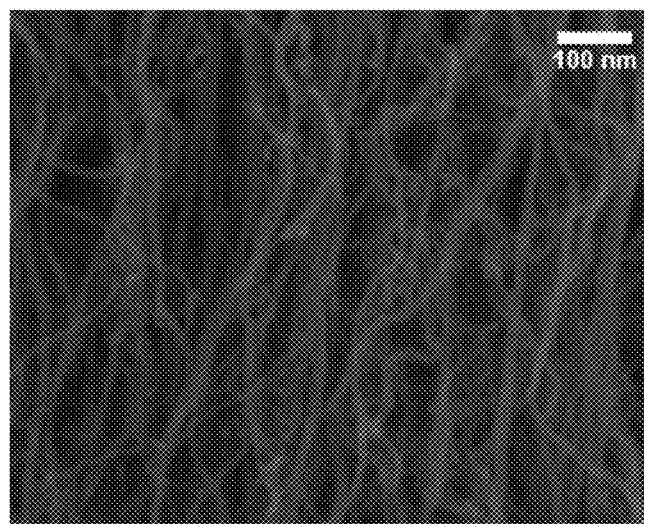
FIG. 2 shows SEM micrographs after deposition by spontaneous reduction of $KMnO_4$ on VACNTs in the conditions of Zhang et al, 2009 [5] (FIG. 2A) and in the conditions of Zhang et al, 2009 [5] but in the absence of 10 M of $HNO_3$ (FIG. 2B).

Reproducing the conditions described in the works of Zhang et al, 2009 [5] such as described in the "Prior art" section above and applying them to a dense carpet of carbon nanotubes, i.e. a carpet of vertically aligned carbon nanotubes of which the density is greater than or equal to $10^8$ nanotubes per $cm^2$ of substrate, no deposition of $MnO_2$ is observed (FIG. 2A). This absence of deposition is confirmed by the absence, before and after the deposition step, of increase in the capacitance and a very small variation in weight of the composite.

Figure 2B:
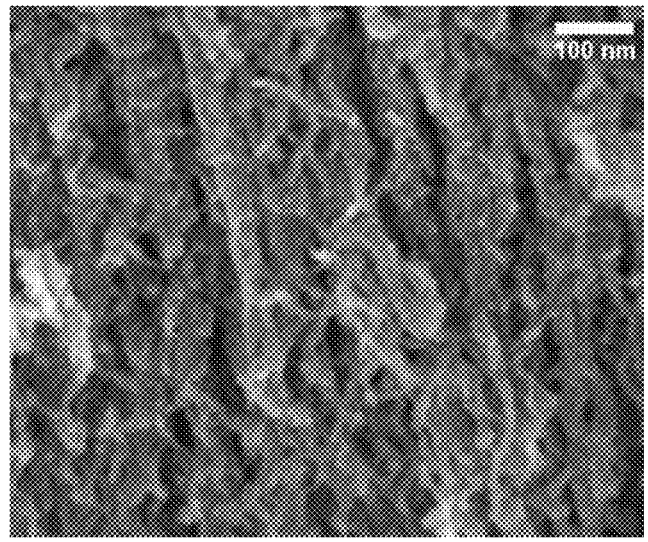

Conversely, by eliminating nitric acid from the solution described in Zhang et al, 2009 [5] and by not modifying the other operating conditions, a deposition of $MnO_2$ is clearly visible on a dense carpet of carbon nanotubes (FIG. 2B).

II.2. Method According to the Present Invention

VACNTs on stainless steel or on aluminium are brought into contact, at 20° C., for 2 h with a 10 mM aqueous solution of $KMnO_4$. The metal substrate provided with the carbon nanotubes and the metal oxide matrix is rinsed with water then with ethanol and next dried in an oven under vacuum at 80° C. for 24 h.

During the bringing into contact, a spontaneous reduction reaction then takes place on the surface of the VACNTs and a manganese oxide is deposited thereon.

Figure 3A:
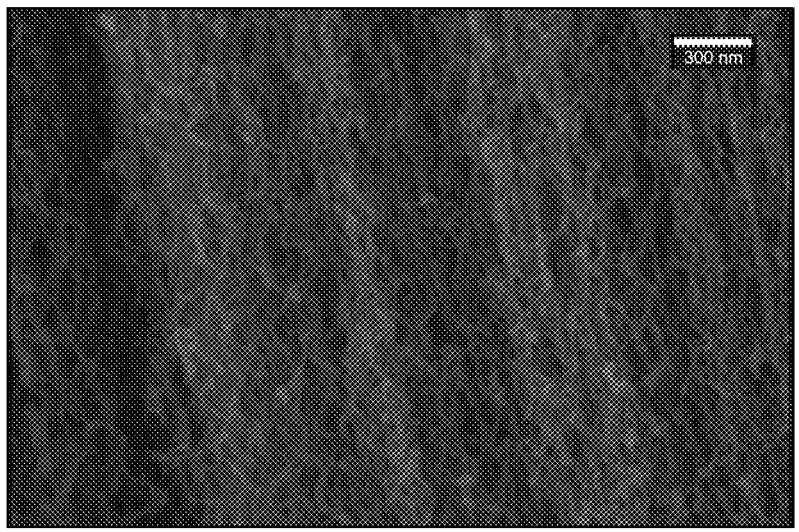
FIG. 3 shows SEM micrographs before (FIG. 3A) and after (FIG. 3B) deposition by spontaneous reduction of $KMnO_4$ on VACNTs. Micrographs taken at the centre of the carpet of 20 µm.
Figure 3B:
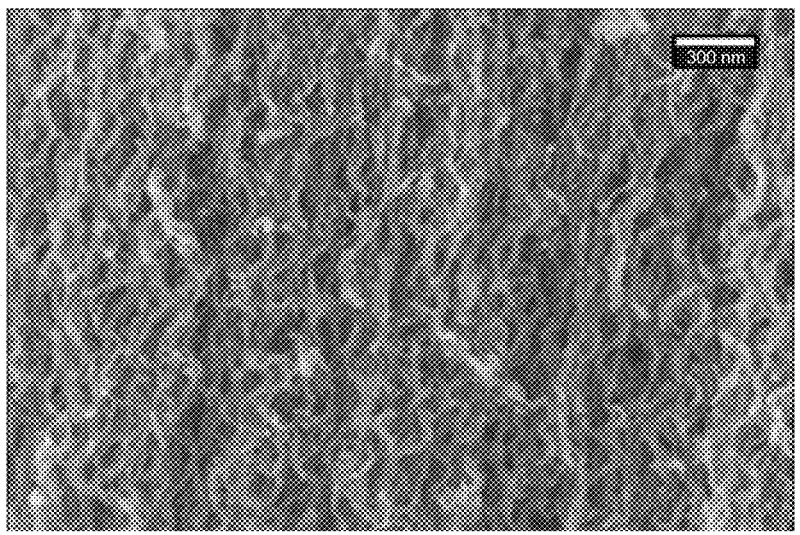
Figure 4A:
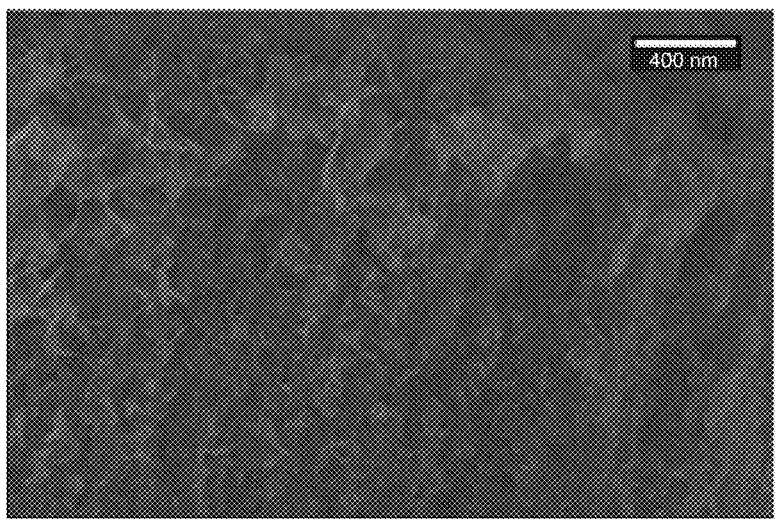
FIG. 4 shows SEM micrographs after deposition by spontaneous reduction of $KMnO_4$ on VACNTs at the top (FIG. 4A), in the middle (FIG. 4B) and at the bottom (FIG. 4C) of the carpet of VACNTs.
Figure 4B:
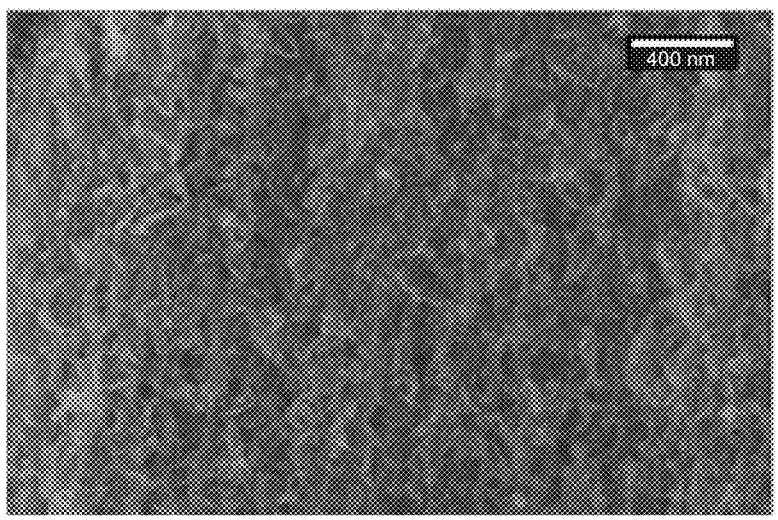
Figure 4C:
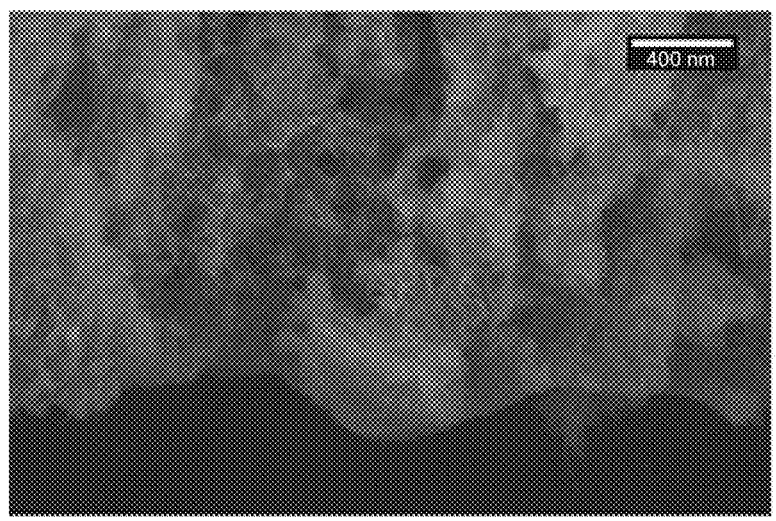
Figure 5:
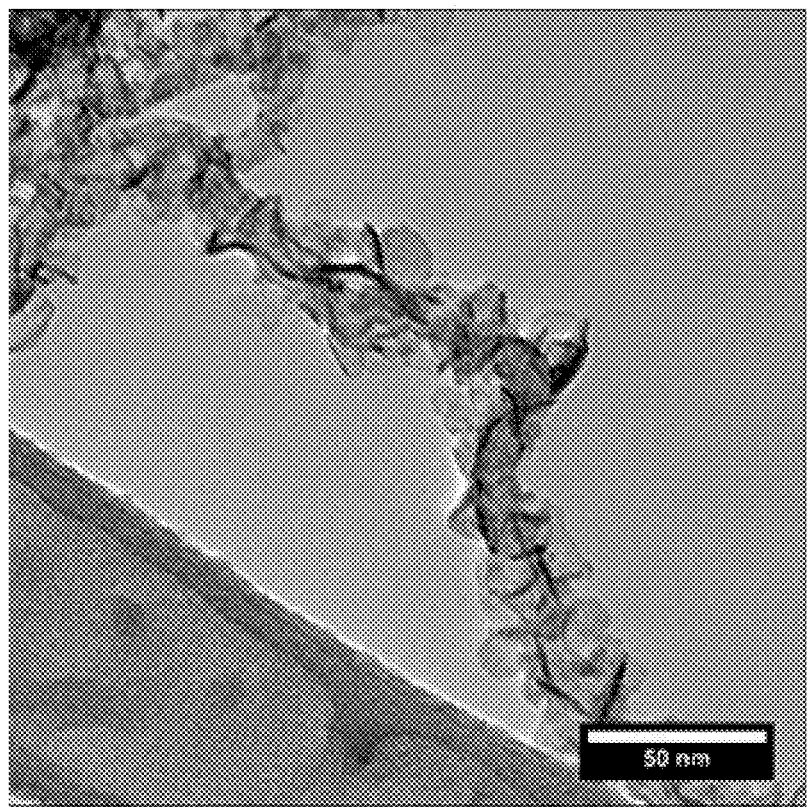
FIG. 5 shows a SEM micrograph of a carbon nanotube after deposition by spontaneous reduction of $KMnO_4$.

SEM (FIGS. 3 and 4) and TEM (FIG. 5) analyses show that the association between the metal oxide and the VACNTs is homogeneous over the whole thickness of the carpet (20 µm in this exemplary embodiment).

In order to characterise the capacitance per surface unit of the electrode according to the invention and to compare it with that of the same electrode (same substrate provided with carbon nanotubes and same specific surface) but without deposition of metal oxide, the cyclic voltammetry technique was used by imposing a voltage between 0 and 0.8 V vs ECS at a scanning speed of 5 mV/s for 5 cycles, in an aqueous electrolyte (0.5M $LiNO_3$).

The characterisation of the capacitance provides a capacitance of 185 F/g and 185 mF/$cm^2$ for the electrode according to the invention (substrate made of aluminium provided with high density carbon nanotubes, of 30 to 50 µm and functionalised by $MnO_2$, whereas the capacitance of the comparative electrode without metal oxide is comprised between 30 and 40 F/g (15 $mF/cm^2$).

The electrode according to the invention thus has a value 5 times greater than for bare VACNTs in terms of gravimetric capacitance and 10 times greater for surface capacitance.

REFERENCES

[1] Patent application CN 103346021 in the name of the Aluminium Corporation of China Ltd published on the 9 Oct. 2013.

[2] Li et al, 2015, «Vertically aligned carbon nanotube@$MnO_2$ nanosheet arrays grown on carbon cloth for high performance flexible electrodes of supercapacitors», RSC Adv., vol. 5, pages 77473-77442.

[3] Lou et al, 2013, «Facile synthesis of manganese oxide/aligned carbon nanotubes over aluminium foil as 3D binder free cathodes for lithium ion batteries», J. Mater. Chem. A, vol. 1, pages 3757-3767.

[4] Ma et al, 2007, «Synthesis and characterization of manganese dioxide spontaneously coated on carbon nanotubes», Carbon, vol. 45, pages 375-382.

[5] Zhang et al, 2009, «Fabrication of a vertically aligned carbon nanotube electrode and its modification by nanostructured $MnO_2$ for supercapacitors», Pure & Applied Chemistry, vol. 81, pages 2317-2325.

[6] Pinault et al, 2005, «Growth of multiwalled carbon nanotubes during the initial stages of aerosol-assisted CCVD», Carbon, vol. 43, pages 2968-2976.

[7] Pinault et al, 2005, «Evidence of sequential lift in growth of aligned multi-walled carbon nanotube multilayers», Nano Lett., vol. 5, pages 2394-2398.

[8] international application WO 2015/071408 in the name of the CEA published on the 21 May 2015.

[9] Dorfler et al, 2013, «High power supercap electrodes based on vertically aligned carbon nanotubes on aluminum», J. of Power Sources, vol. 227, pages 218-228.

[10] Liatard et al, 2015, «Vertically aligned carbon nanotubes on aluminum as a light-weight positive electrode for lithium-polysulfide batteries», Chemical Communications, vol. 51, pages 7749-7752.

[11] Arcila-Velez et al, 2014, «Roll-to-roll synthesis of vertically aligned carbon nanotube electrodes for electrical double layer capacitors», Nano Energy, vol. 8, pages 9-16.

[12] International application WO 2009/103925 in the name of the CEA published on the 27 Aug. 2009.

The invention claimed is:

1. A method for preparing an electrode comprising a metal substrate, vertically aligned carbon nanotubes and a metal oxide deposited by a spontaneous reduction reaction over the whole length of said vertically aligned carbon nanotubes, said method comprising:

a) synthesizing, on a metal substrate, a carpet of vertically aligned carbon nanotubes of which the density is comprised between $10^8$ and $10^{13}$ nanotubes.$cm^{-2}$ of substrate; and b) bringing into contact said carpet of vertically aligned carbon nanotubes synthesized on the metal substrate during the synthesizing (a) with an aqueous solution comprising a precursor of said metal oxide of which a redox potential is greater than a relative potential of the carpet of vertically aligned carbon nanotubes synthesised on the metal substrate, whereby a metal oxide matrix is deposited over the whole length of said vertically aligned carbon nanotubes during said bringing into contact (b) thereby forming the electrode, wherein:

said aqueous solution comprising the precursor of the metal oxide consists of said precursor diluted or solubilised in water, and no other chemical compound different from said precursor is present in the solution implemented during said bringing into contact (b), and the bringing into contact (b) is exclusively carried out at a temperature less than or equal to 40° C.

2. The method according to claim 1, wherein said metal substrate comprises at least one metal selected from the group consisting of titanium, nickel, aluminium, copper, chromium, tantalum, platinum, gold, silver, and stainless steel, and wherein said metal substrate optionally further comprises silicon, carbon, or both.

3. The method according to claim 1, wherein following said synthesizing (a) and prior to said bringing into contact (b), the vertically aligned carbon nanotubes are subjected to an oxidizing treatment.

4. The method according to claim 1, wherein said metal oxide is an oxide of at least one transition metal.

5. The method according to claim 1, wherein said metal oxide is at least one selected from the group consisting of a ruthenium oxide, a titanium oxide, a manganese oxide, a copper oxide, a nickel oxide, a cobalt oxide, an iron oxide, a chromium oxide, a vanadium oxide, and mixtures thereof.

6. The method according to claim 1, wherein said precursor of said metal oxide is selected from the group consisting of a perruthenate salt, a pertitanate salt, a permanganate salt, a perferrate salt, a perchromate salt, a pervanadate salt, and mixtures thereof.

7. The method according to claim 1, wherein said precursor of said metal oxide is present in said aqueous solution in a quantity comprised between 1 mM to 500 mM.

8. The method according to claim 1, wherein following said bringing into contact (b), said method further comprises a rinsing step and optionally a drying step.

* * * * *